No. 859,059. PATENTED JULY 2, 1907.
C. J. HAEBERLI & H. E. O. SCHMIDT.
ANGULAR BIT BRACE.
APPLICATION FILED JULY 20, 1906.
2 SHEETS—SHEET 1.
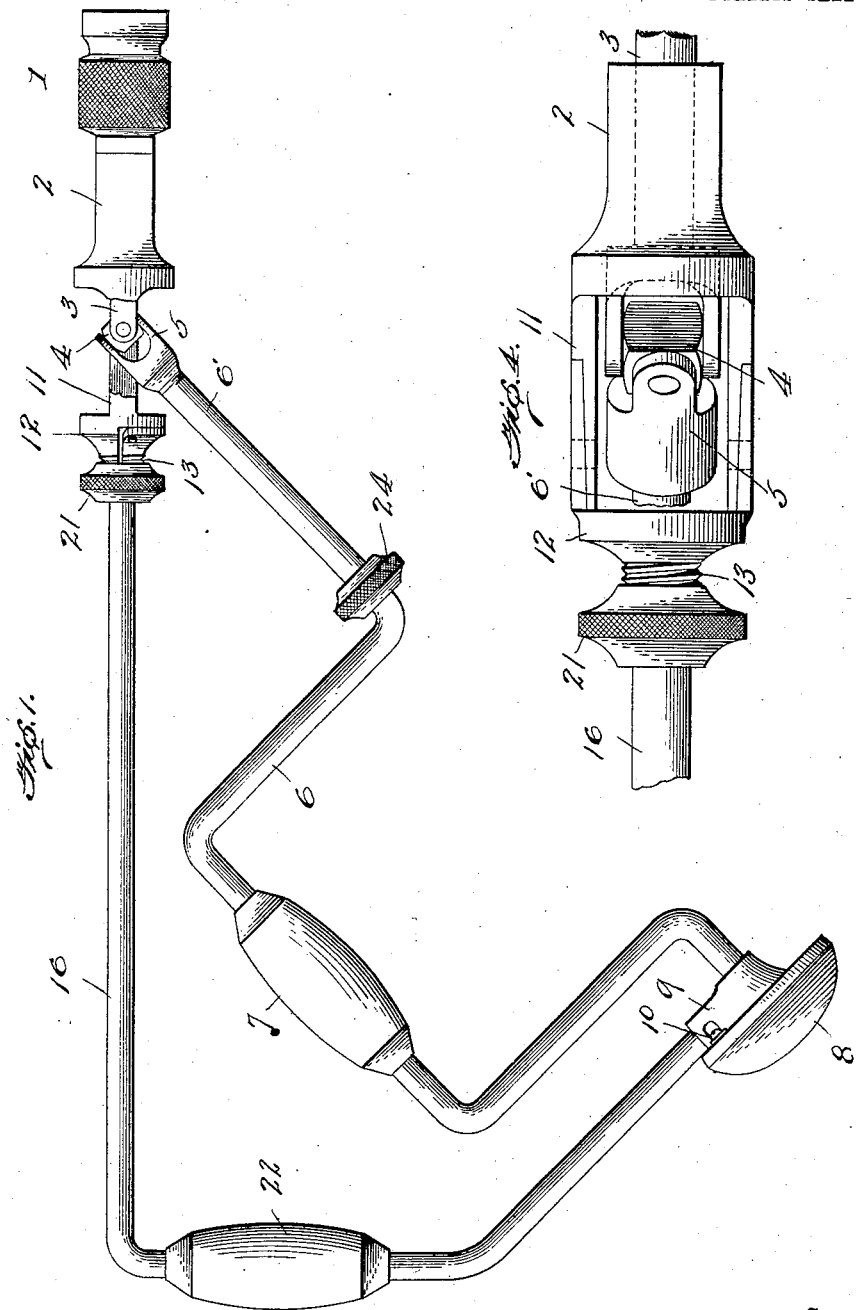
Witnesses
B. M. Offutt.
Christ Feinle.
Inventors
Christopher J. Haeberli,
and Herbert E. O. Schmidt
By Emil Neuhart
Attorney No. 859,059. PATENTED JULY 2, 1907.
C. J. HAEBERLI & H. E. O. SCHMIDT.
ANGULAR BIT BRACE.
APPLICATION FILED JULY 20, 1906.
2 SHEETS—SHEET 2.
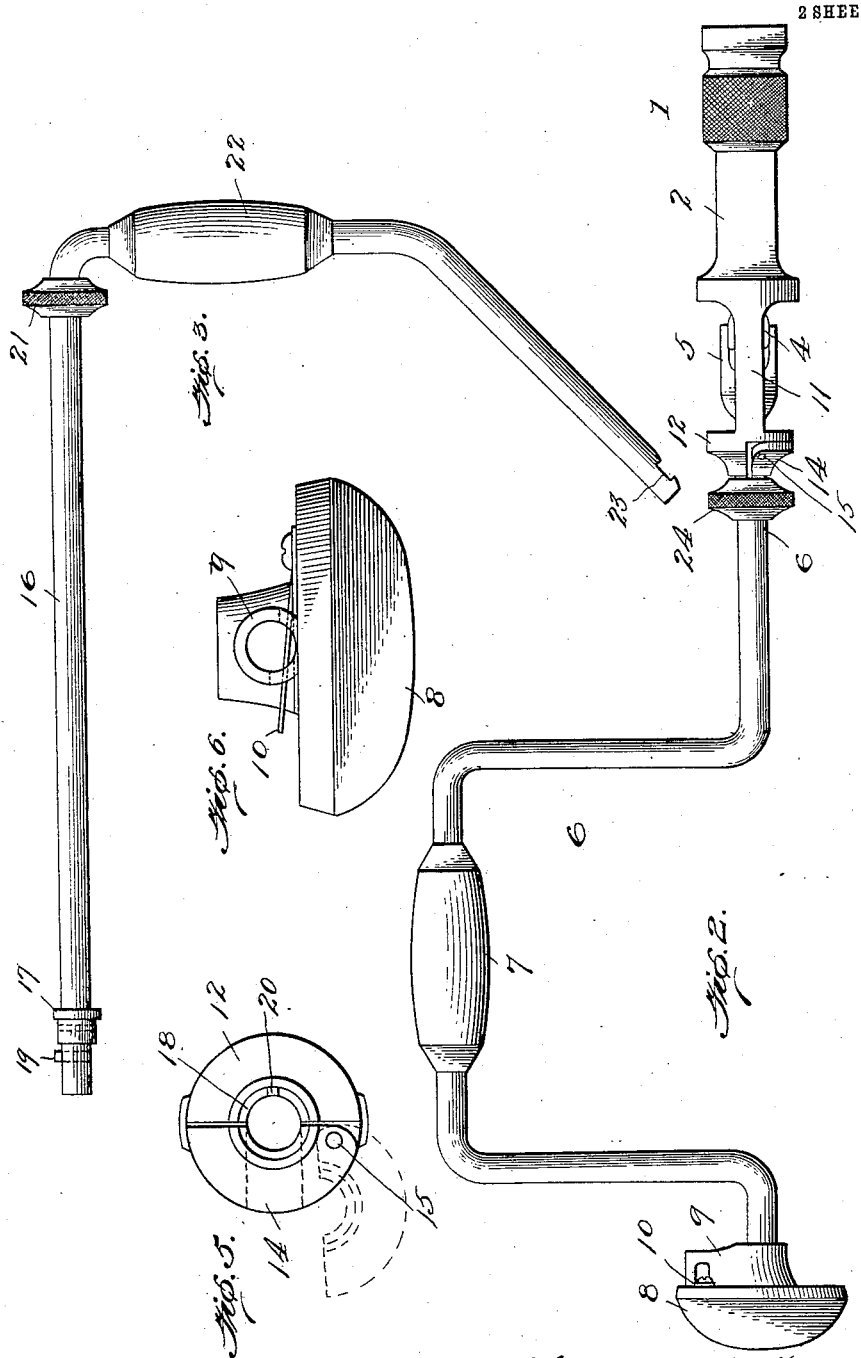
Witnesses
BM. Offutt,
Christ Feinle.
Inventors
Christopher J. Haeberli,
and Herbert E. O. Schmidt
By Emil Neuhart,
Attorney

UNITED STATES PATENT OFFICE.

CHRISTOPHER J. HAEBERLI AND HERBERT E. O. SCHMIDT, OF BUFFALO, NEW YORK, ASSIGNORS OF ONE-SIXTH TO EDWARD ZIEGLER AND ONE-SIXTH TO CHARLES E. DUMKE, OF BUFFALO, NEW YORK.

ANGULAR BIT-BRACE.

No. 859,059.      Specification of Letters Patent.      Patented July 2, 1907.

Application filed July 20, 1906. Serial No. 327,055.

*To all whom it may concern:*

Be it known that we, CHRISTOPHER J. HAEBERLI and HERBERT E. O. SCHMIDT, citizens of the United States, residing at Buffalo, in the county of Erie and State of New York, have invented certain new and useful Improvements in Angular Bit-Braces, of which the following is a specification.

The present invention relates to improvements in angular bit braces.

The object of the invention is to improve the construction in certain particulars of this class of devices in order to produce a combined angular bit brace, or one which may be used as in the ordinary manner for drilling holes.

The objects of the invention are attained by providing a device of this character composed of an angular supporting frame, to be used when boring holes near projections which would obstruct the use of a straight brace bit, when the angular frame is not necessary, the same may be readily detached, and the remaining portion of the device be secured in alinement and operated as usual.

The invention consists essentially of the combination tool and certain novel features of construction and combinations for detaching parts not wanted, and securing the desired parts, to effect the desired implement.

In the accompanying drawings I have illustrated one example of the physical embodiment of my invention, constructed according to the best mode I have so far devised for the practical application of the principles.

Figure 1 is a view illustrating the device as a whole, constituting an angular brace bit, parts being broken away for convenience of illustration. Fig. 2 illustrates the device when used as a straight brace bit, the angular supporting frame being detached. Fig. 3 is a view showing the angular supporting frame detached. Fig. 4 is an enlarged view showing the universal joint for transmitting motion from the crank to the bit socket. Fig. 5 is a face view of the split screw threaded sleeve formed on the bearing extension of the socket and adapted to receive a nut for securing one end of the angular supporting frame. Fig. 6 illustrates the head of the crank portion of the brace showing a locking spring for securing the other end of the angular supporting frame when used.

Referring to the drawings, the numeral 1 designates the bit socket which may be of usual construction and adapted to receive a bit; 2, a bearing sleeve for the shank; 3, the shank; 4, a universal joint formed between one end of the shank 3 and the end 5 of the crank 6; 7 a handle on the crank; 8, the head of the crank, provided with a lug or housing 9; 10, a flat spring extending across the opening in the housing; 11, an extension or housing connecting the bearing 2 with a split sleeve 12; 13 exterior screw threads on the split sleeve; 14, a hinged portion of the split sleeve, pivoted at 15 and adapted to swing outwardly as indicated in dotted lines Fig. 5; 16, the angular supporting frame, which in this instance is a rod bent to the preferred form as illustrated in the drawings; 17, a flanged sleeve secured to the supporting frame and adapted to seat in the recess 18 of the split sleeve 12; 19, a pin located near the end of the supporting frame 16 and adapted to enter the recess 20 formed in the interior of the split sleeve, to prevent rotary movement of the end of the frame in said sleeve; 21, a threaded nut, to engage the screw threads of the split ring or sleeve 12 and clamp the end of the supporting frame within said sleeve when the angular supporting frame is used, as illustrated in Fig. 1; 22, a handle conveniently located on the supporting frame to be grasped by the hand when the device is in use; 23, a cut-away portion at one end of the supporting frame adapted to be engaged by the spring 10 when the end of the rod is inserted in the housing on the head 8; and 24 is a securing nut, carried loosely on the lower end of the crank rod 6′ when not in use, as in Fig. 1; when the bit-brace is used as illustrated in Fig. 2, said nut securely holds the end of the crank within the split ring or sleeve 12, as illustrated.

As before stated, the device as illustrated in Fig. 1 is assembled for use as an angular bit-brace, and in this construction the bit socket may be placed adjacent the base board of a wall or other obstruction in which a hole is to be bored, and the crank 6 may be freely rotated as will be understood from the drawings.

As illustrated in Fig. 2, the angular supporting frame is dispensed with, and the device may be used in any of the ordinary manners, to be used where the place for boring is accessible for a straight bit-brace.

The manner of applying the angular supporting frame, and adapting the device for use as an angular bit-brace is simple and readily accomplished. Assuming the device to be in the condition illustrated in Fig. 2, wherein an efficient straight bit-brace is illustrated, to attach the supporting frame, the nut 24 is first unscrewed from the split sleeve, and pulled back on the crank, out of the way; the hinged or pivoted portion 12 of the split sleeve is swung down to dotted position Fig. 5, and the portion 6′ of the crank 6 is disengaged from the split sleeve by a swinging movement of the crank on the universal joint 4 as a center. The device is now in position to receive the angular supporting frame. To apply the frame, the end of the bar forming the same is inserted within the split sleeve, the pin 19 seating in recess 20 and the flange 17 closing against the edge of the split sleeve, the hinged or pivoted portion 14 may have been previously closed, or the end of the frame may be placed in one half of the sleeve and the other half closed as desired. To secure the joint, the nut 21 is screwed home on the threads 13 of the split sleeve, and the end of the frame is held rigidly in the sleeve. Now by the simple operation of inserting the other end of the frame 16 into the housing 9 on the head, the spring 10 enters the notch or cut away portion 23 on the frame and securely holds the latter in place, thus the device is ready for use as an angular bit-brace. In operation the crank handle 7 and frame handle 22 are grasped by a hand, for instance the right and left hands respectively, pressure from the body may be had on the head 8, and the crank may be freely turned within the angular frame transmitting rotary motion through the universal joint to the bit socket.

From the above description taken in connection with the drawings it is evident that I have produced a device which fulfils all the conditions set forth as the purpose or objects of my invention. The parts are easily interchanged, detached, or applied, and when used as either an angular bit brace or a straight bit brace, will be effective for use.

I am aware that patents have been issued for devices involving the general principles of my invention, and I do not broadly claim an angular bit brace, but What I do claim is:

1. The combination with a bit-socket and a crank having its axis of rotation arranged at an angle to said socket, of an angular supporting-frame, a housing or extension connected to the bit-socket, a universal joint within the housing connecting the bit socket and crank, a split sleeve at the end of said extension adapted to receive either one end of said supporting frame or the crank, means for locking either therein, and detachable means for securing the other end of said frame in the crank head.

2. In a bit-brace, the combination with a bit-socket, a bearing therefor having an extension, and a crank for rotating said socket having a housing formed on the head thereof, of an angular supporting-frame, a notch cut in the end of said frame, and a spring on the crank head adapted to engage said notch and secure one end of the frame in said housing, the other end of said frame being secured to the extension of said socket bearing.

3. The combination with a bit-socket and a crank having its axis of rotation disposed at an angle to the socket, of an angular supporting-frame, a housing or extension connected to the bit-socket, a universal joint within the housing connecting the bit-socket and crank, a split sleeve on the end of said housing adapted to receive one end of the supporting-frame, threads on the sleeve and a nut for clamping the sleeve over the frame, a housing formed on the head of the crank, a spring located across the mouth thereof, and the end of the frame being notched to engage said spring when the frame is inserted in said housing.

4. In a bit-brace, the combination with a bit-socket and a bearing-member having an extension; of an angular supporting-frame, a crank having a head thereon, a housing formed on said head, a spring located across the mouth of said housing, and the end of said frame bar provided with a notch to engage said spring when the bar is inserted in the housing.

5. The combination with a bit-socket and a bearing-member to which said socket is rotatably held, a crank having operative connection with said socket and capable of being moved to bring its axis of rotation coincident with the axis of said socket or at an angle thereto, an angular supporting-frame detachably connected to said bearing-member and to the head of said crank to retain said crank at an angle to said socket, and clamping means to retain said crank coincident with the said socket when said angular supporting-frame is detached.

In testimony whereof, we have hereunto set our hands in the presence of two subscribing witnesses.

CHRISTOPHER J. HAEBERLI.
HERBERT E. O. SCHMIDT.

Witnesses:
EMIL NEUHART,
HARRY HARRIS.